United States Patent
Pandey et al.

(10) Patent No.: US 12,198,239 B2
(45) Date of Patent: Jan. 14, 2025

(54) CONSTRAINT-BASED MULTI-PARTY IMAGE MODIFICATION

(71) Applicant: INTERNATIONAL BUSINESS MACHINES CORPORATION, Armonk, NY (US)

(72) Inventors: Diwesh Pandey, Jeevan Bhima Nagar (IN); Smitkumar Narotambhai Marvaniya, Bangalore (IN); Subarna Ghosh, Bangalore (IN); Shiladitya Ghosh, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 361 days.

(21) Appl. No.: 17/479,970

(22) Filed: Sep. 20, 2021

(65) Prior Publication Data

US 2023/0089790 A1    Mar. 23, 2023

(51) Int. Cl.
  *G06T 11/60*    (2006.01)
  *G06F 18/24*    (2023.01)
  (Continued)

(52) U.S. Cl.
  CPC ............ *G06T 11/60* (2013.01); *G06F 18/24* (2023.01); *G06T 7/11* (2017.01)

(58) Field of Classification Search
  CPC . G06T 11/60; G06T 7/11; G06T 2207/20084; G06T 2207/30196; G06F 18/24; G06V 20/70
  See application file for complete search history.

(56) References Cited

U.S. PATENT DOCUMENTS

| | | |
|---|---|---|
| 2005/0144090 A1 | 6/2005 | Gadamsetty |
| 2014/0196152 A1 | 7/2014 | Ur et al. |

(Continued)

FOREIGN PATENT DOCUMENTS

| | | |
|---|---|---|
| CN | 104808979 A | 7/2015 |
| CN | 108179453 B | 6/2018 |

(Continued)

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — David F Dunphy
(74) *Attorney, Agent, or Firm* — CUENOT, FORSYTHE & KIM, LLC (57) ABSTRACT

A computer hardware system having an image modification platform includes a hardware processor configured to initiate the following executable operations. A digital image is received by the image modification platform. A plurality of objects within the digital image are detected using an object segmentation engine of the image modification platform. The plurality of objects are classified using an object classification engine of the image modification platform and involve associating a stakeholder, respectively, to at least two of the plurality of objects. A knowledge map for the digital image is generated based upon the classifying and the stakeholders using a knowledge map engine. A set of constraints are identified for each of the plurality of objects based upon the knowledge map and the plurality of stakeholders. A modified digital image to be published is generated by an interactive image generation engine using the sets of constraints.

20 Claims, 7 Drawing Sheets

(51) Int. Cl.
*G06K 9/62* (2022.01)
*G06T 7/11* (2017.01)

(56) References Cited

U.S. PATENT DOCUMENTS

| | | | |
|---|---|---|---|
| 2017/0249674 A1 | 8/2017 | Kerger et al. | |
| 2019/0318405 A1* | 10/2019 | Hu | G06V 20/00 |
| 2021/0097691 A1 | 4/2021 | Liu | |
| 2021/0217071 A1 | 7/2021 | Wang et al. | |
| 2021/0264195 A1 | 8/2021 | Ingram | |
| 2021/0264207 A1* | 8/2021 | Smith | G06V 10/44 |

FOREIGN PATENT DOCUMENTS

| | | | | |
|---|---|---|---|---|
| CN | 108701317 A | | 10/2018 | |
| CN | 111081095 A | * | 4/2020 | G09B 5/065 |
| CN | 112529768 A | | 3/2021 | |
| CN | 113191834 A | | 7/2021 | |
| WO | WO-2018155931 A1 | * | 8/2018 | A63F 13/45 |

OTHER PUBLICATIONS

"Automatic privacy protection for personal images on social networking," [online] IP.com Prior Art Database Technical Disclosure, No. IPCOM000251754D, Dec. 1, 2017, retrieved from the Internet: <https://priorart.ip.com/IPCOM/000251754>, 3 pg.

Yu, J. et al., "GAN-Based Differential Private Image Privacy Protection Framework for the Internet of Multimedia Things," Sensors, Jan. 21, vol. 1, p. 58.

Vishwamitra, N. et al., "Towards pii-based multiparty access control for photo sharing in online social networks," In Proceedings of the 22nd ACM on Symposium on Access Control Models and Technologies, Jun. 7, 2017, pp. 155-166.

Qin, X. et al., "Image Inpainting: A Contextual Consistent and Deep Generative Adversarial Training Approach," In 2017 4th IAPR Asian Conference on Pattern Recognition (ACPR), Nov. 26, 2017, pp. 588-593, IEEE (Abstract).

Zhang, T. et al., "Realistic Face Image Generation Based on Generative Adversarial Network," In 2019 16th International Computer Conference on Wavelet Active Media Technology and Information Processing, Dec. 14, 2019 op. 303-306, IEEE (Abstract).

Tuptewar, D.J. et al., "Robust exemplar-based image and video inpainting for object removal and region filling," In 2017 International Conference on Intelligent Computing and Control (I2C2), Jun. 23, 2017, pp. 1-4, IEEE (Abstract).

Casaca, W. et al., "A user-friendly interactive image inpainting framework using Laplacian coordinates," In 2015 IEEE International Conference on Image Processing (ICIP), Sep. 27, 2015, pp. 862-866, IEEE (Abstract).

Xu, S. et al., "Edge-guided generative adversarial network for image inpainting," In 2017 IEEE Visual Communications and Image Processing (VCIP), Dec. 10, 2017, pp. 1-4, IEEE (Abstract).

Li, F. et al., "Hideme: Privacy-preserving photo sharing on social networks," In IEEE Infocom 2019—IEEE Conference on Computer Communications, Apr. 29, 2019, pp. 154-162.

WIPO Appln. No. PCT/CN2022/119282, International Search Report and Written Opinion, Nov. 29, 2022, 9 pg.

* cited by examiner

CONSTRAINT-BASED MULTI-PARTY IMAGE MODIFICATION

BACKGROUND

The present invention relates to digital image modification, and more specifically, to the modifying a digital image using constraints received from multiple parties.

A digital image is oftentimes comprised of many different types of objects. For example, an image whose subject may be a person standing on a beach could include such objects as an umbrella, a blanket, seabird, water, the beach itself, sandals being worn by the person, a beach hat, sunglasses, the swim suit worn by the person among other objects. Additionally, certain of these objects can have special significance to stakeholders (i.e., manufacturers/sellers or other individuals/organizations having an association therewith) of these objects. In situations where the digital image is being presented in a particular communication channel (e.g., in an advertisement or a website), the stakeholder has an interest in presenting the object in a favorable light.

Current technology exists to modify an already-generated image. However, this technology typically involves a single party making and approving of the changes. Consequently, a need exists for a technology that can take an inputted image and from that inputted image both identify stakeholders associated with that image as well as generate a modified image that meets the requirements of these stakeholders.

SUMMARY

A computer-implemented method within a computer hardware system having an image modification platform disclosed. A digital image is received by the image modification platform. A plurality of objects within the digital image are detected using an object segmentation engine of the image modification platform. The plurality of objects are classified using an object classification engine of the image modification platform and involve associating a stakeholder, respectively, to at least two of the plurality of objects. A knowledge map for the digital image is generated based upon the classifying and the stakeholders using a knowledge map engine. A set of constraints are identified for each of the plurality of objects based upon the knowledge map and the plurality of stakeholders. A modified digital image to be published is generated by an interactive image generation engine using the sets of constraints.

The process can also include the image modification platform being configured to initiate, based upon the knowledge map, a multimodal communication with the plurality of stakeholders. The sets of constraints can be identified based upon information received by the image modification platform during the multimodal communication. At least a portion of the sets of constraints can be automatically generated using the information received by the image modification platform during the multimodal communication, and information provided to the stakeholders during the multimodal communication can be based upon the knowledge map. Additionally, a version of the modified digital image can be provided to the stakeholders. Feedback to the version of the modified digital image can be received from the stakeholders provide during the multimodal communication, and the sets of constraints can be modified based upon the feedback. Another version of the modified digital image can be generated using the modified plurality of constraints, and the sets of constraints can be iteratively modified based upon one or more additional versions of the modified image until a last modified digital image provided to the stakeholders is approved by all of the stakeholders. The last modified digital image is the modified digital image to be published. Also, the knowledge map for the digital image can map relationships between objects within the digital image and includes attributes for each of the objects.

A computer hardware system having an image modification platform includes a hardware processor configured to initiate the following executable operations. A digital image is received by the image modification platform. A plurality of objects within the digital image are detected using an object segmentation engine of the image modification platform. The plurality of objects are classified using an object classification engine of the image modification platform and involve associating a stakeholder, respectively, to at least two of the plurality of objects. A knowledge map for the digital image is generated based upon the classifying and the stakeholders using a knowledge map engine. A set of constraints are identified for each of the plurality of objects based upon the knowledge map and the plurality of stakeholders. A modified digital image to be published is generated by an interactive image generation engine using the sets of constraints.

The computer hardware system can also include the image modification platform being configured to initiate, based upon the knowledge map, a multimodal communication with the plurality of stakeholders. The sets of constraints can be identified based upon information received by the image modification platform during the multimodal communication. At least a portion of the sets of constraints can be automatically generated using the information received by the image modification platform during the multimodal communication, and information provided to the stakeholders during the multimodal communication can be based upon the knowledge map. Additionally, a version of the modified digital image can be provided to the stakeholders. Feedback to the version of the modified digital image can be received from the stakeholders provide during the multimodal communication, and the sets of constraints can be modified based upon the feedback. Another version of the modified digital image can be generated using the modified plurality of constraints, and the sets of constraints can be iteratively modified based upon one or more additional versions of the modified image until a last modified digital image provided to the stakeholders is approved by all of the stakeholders. The last modified digital image is the modified digital image to be published. Also, the knowledge map for the digital image can map relationships between objects within the digital image and includes attributes for each of the objects.

A computer program product is disclosed that comprises a computer readable storage medium having stored therein program code. The program code, which when executed by a computer hardware system including an image modification platform, causes the computer hardware system to perform the following. A digital image is received by the image modification platform. A plurality of objects within the digital image are detected using an object segmentation engine of the image modification platform. The plurality of objects are classified using an object classification engine of the image modification platform and involve associating a stakeholder, respectively, to at least two of the plurality of objects. A knowledge map for the digital image is generated based upon the classifying and the stakeholders using a knowledge map engine. A set of constraints are identified for each of the plurality of objects based upon the knowledge map and the plurality of stakeholders. A modified digital image to be published is generated by an interactive image generation engine using the sets of constraints.

The computer program product can also include the image modification platform being configured to initiate, based upon the knowledge map, a multimodal communication with the plurality of stakeholders. The sets of constraints can be identified based upon information received by the image modification platform during the multimodal communication. At least a portion of the sets of constraints can be automatically generated using the information received by the image modification platform during the multimodal communication, and information provided to the stakeholders during the multimodal communication can be based upon the knowledge map. Additionally, a version of the modified digital image can be provided to the stakeholders. Feedback to the version of the modified digital image can be received from the stakeholders provide during the multimodal communication, and the sets of constraints can be modified based upon the feedback. Another version of the modified digital image can be generated using the modified plurality of constraints, and the sets of constraints can be iteratively modified based upon one or more additional versions of the modified image until a last modified digital image provided to the stakeholders is approved by all of the stakeholders. The last modified digital image is the modified digital image to be published. Also, the knowledge map for the digital image can map relationships between objects within the digital image and includes attributes for each of the objects.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
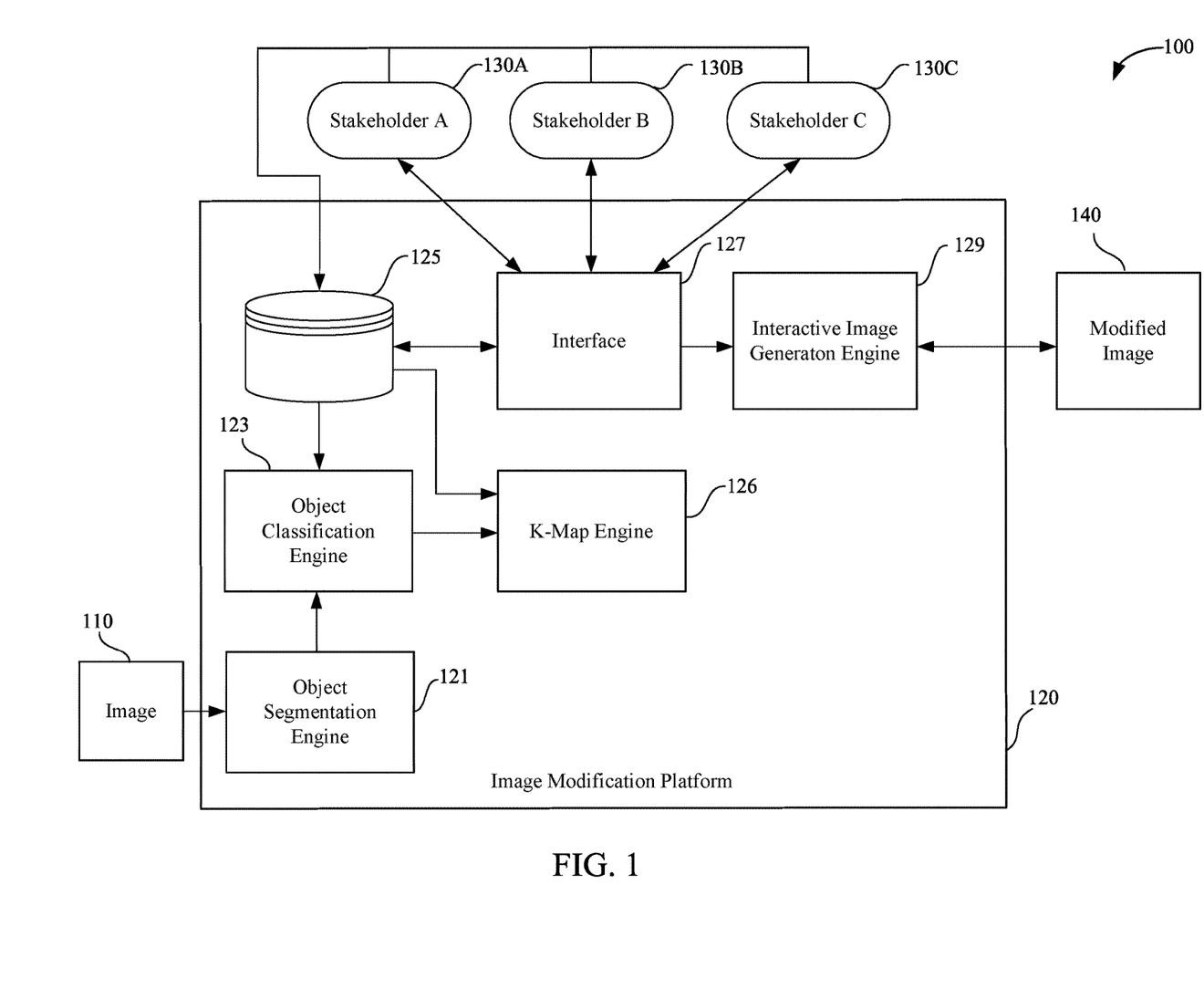
FIG. 1 is a block diagram illustrating an example architecture for an image modification platform according to an embodiment of the present invention.
Figure 2A:
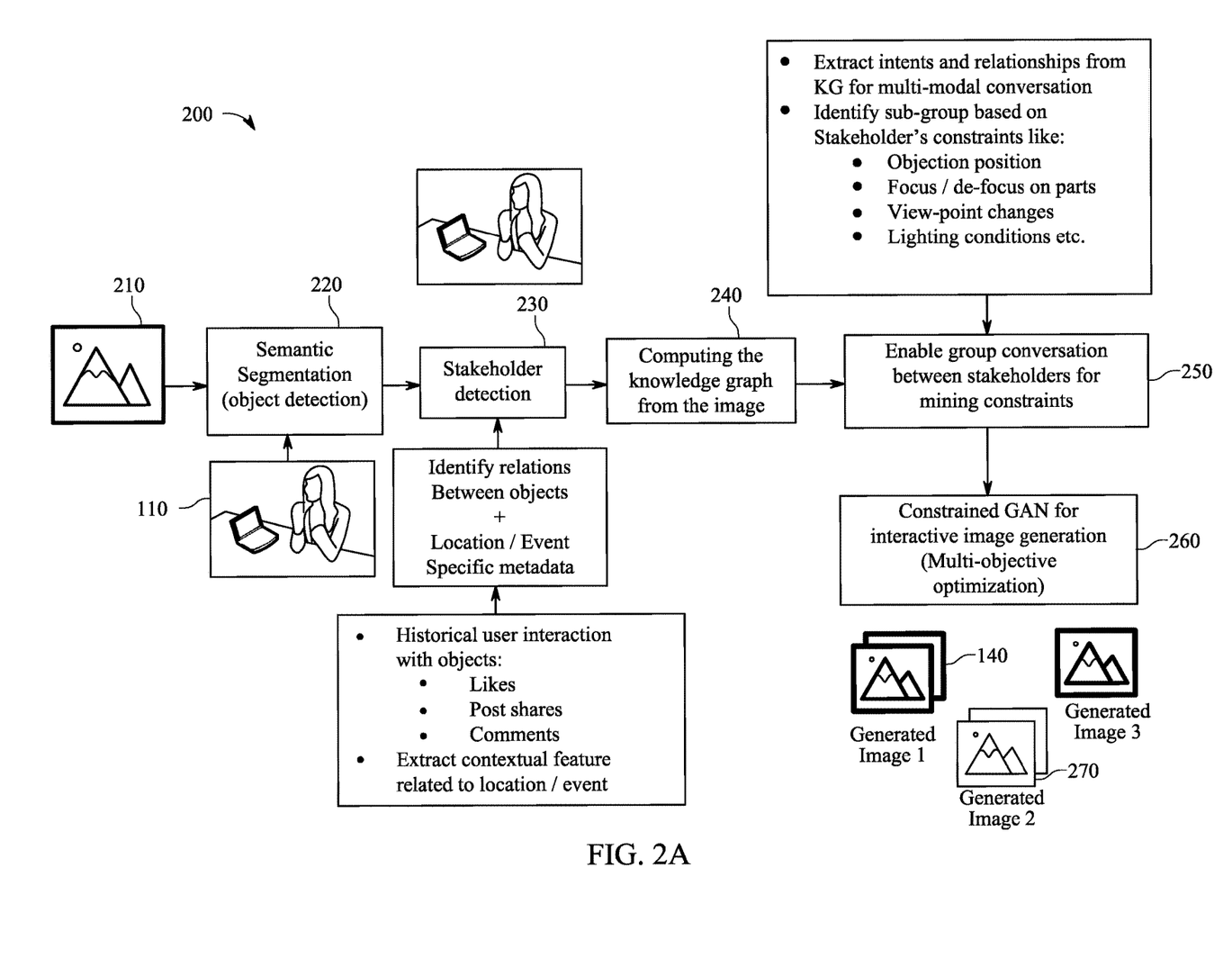
FIG. 2A is a block diagram illustrating an exemplar process using the architecture of FIG. 1 according to an embodiment of the present invention.

Reference is made to FIG. 2A and FIG. 1, which respectively illustrate a methodology 200 of generating a modified image 140 from an initial image 110 using constraints from a plurality of stakeholders 130A, 130B, and 130C and an architecture 100 including an image modification platform 120 in which the methodology is employed according to certain aspects of the present disclosure. In operation, the initial digital image 110 is received by the image modification platform 120. A plurality of objects within the digital image 110 are detected using an object segmentation engine 121 of the image modification platform 120. The plurality of objects are classified using an object classification engine 123 of the image modification platform 120 and involve associating a stakeholder 130A, 130B, 130C, respectively, to at least two of the plurality of objects. A knowledge map 300 (illustrated in FIG. 3) for the digital image 110 is generated based upon the classifying and the stakeholders 130A, 130B, 130C using a knowledge map engine 126. A set of constraints are identified for each of the plurality of objects based upon the knowledge map 300 and the plurality of stakeholders 130A, 130B, 130C. A modified digital image 140 to be published is generated by an interactive image generation engine 129 using the sets of constraints.

More specifically and with reference to the methodology 200 illustrated in FIG. 2, in 210, a digital image 140 to be modified is received by an image modification platform 120. In 220, an object segmentation engine 121 of the image modification platform 120 detects discrete objects within the image 110. As used herein, the term "object" refers to discrete, non-person elements of an image 110. For example, an image 110 of a person standing at beach could produce, for example, the following objects: an umbrella, a blanket, seabird, water, beach, sandals being worn by the person, a beach hat, sunglasses, and the swim suit worn by the person. The image modification platform 120 is not limited as to the particular technology used to implement the object segmentation engine 121 as many existing technologies so capable exist. However, in certain aspects of the image modification platform 120, the object segmentation engine 121 employs a Mask R-CNN, which is a variant of a deep neural network.

A conventional neural network (CNN) is a type of artificial neural network used in image processing and recognition. A conventional CNN employs a convolutional layer, a pooling layer, and a full connected layer. The convolutional layer abstracts the image 100 as a feature map. The pooling layer downsamples the feature map via the summarization of the presence of features in portions of the feature map. The fully connected layer connects individual nodes (i.e., "neurons") in the other layers. A R-CNN (or RCNN) refers to a Region-Based CNN. In this variation, bounding boxes are used in object regions, which can be used to classify multiple image regions of the image 110. Mask R-CNN builds upon Faster R-CNN and provides, as outputs, for each candidate object, a class object, a bounding-box offset, and an object mask.

In 230, objects identified in 220 are classified (e.g., labeled) using an object classification engine 123 of the image modification platform 120. Although illustrated as being separate from the object segmentation engine 123, a portion or all of the object classification engine 123 can be incorporated within the object segmentation engine 121. The object classification engine 123 is not only configured to classify each item, the object classification engine 123 is configured to identify one or more stakeholders 130A, 130B, 130C associated with each object in the image 110. For example, assuming that one of the objects identified was shoes, the object classification engine 123, using information contained within a data repository 125, can identify the particular manufacturer of the particular brand of shoe being illustrated in the image 110.

For example, many types of shoes (as with other objects) have visually-distinguishable characteristics (e.g., a logo) that can be used to identify the particular stakeholder. The information contained within the data repository 125 can store the relationship between these stakeholders 130A, 130B, 130C and their respective visually-distinguishable characteristics of the objects. These associations can be built using the object classification engine 123 as well as being provided by the stakeholders 130A, 130B, 130C themselves. In this manner, an identity (i.e., classification) of the object along with an associated stakeholder 130, 130B, 130C of the object can be determined.

Figure 3:
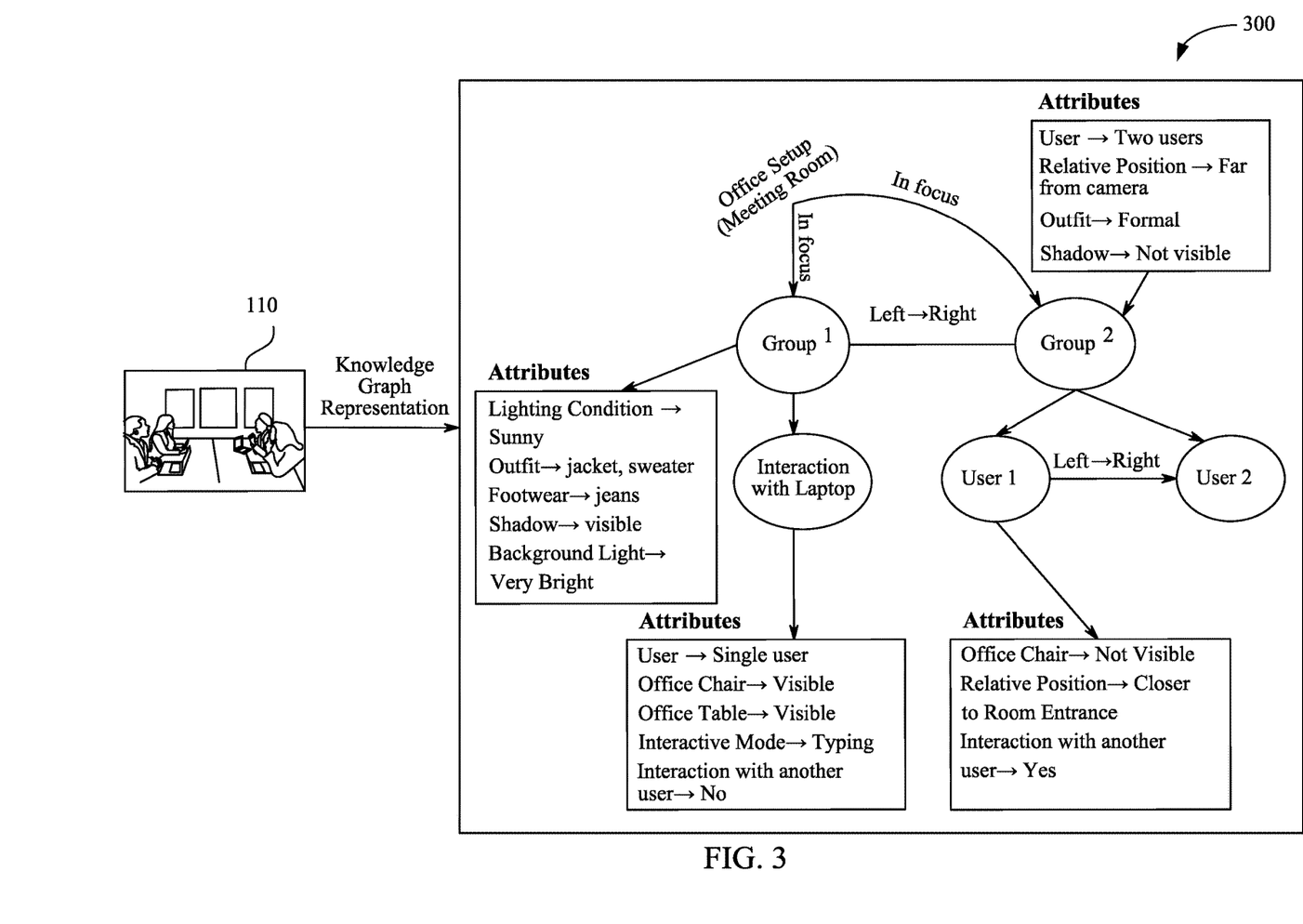
FIG. 3 is exemplary representation of a knowledge map according to an embodiment of the present invention.

In 240, a knowledge map 300 (also referred to as a "K-map") is generated for the particular image 110 using a K-map engine 126 of the image modification platform 120. An example of a K-map 300 is illustrated in FIG. 3. The generation of a knowledge map 300 is a well-known technology that has been used in many different contexts. In the particular context of the present invention, a specialized knowledge map 300 is being used to map relationships between nodes (i.e., objects of the image 110) as well as including hierarchical attributes of the nodes. Although not limited in this manner, these relationships between nodes can include relative positioning as well as being part of a common grouping. An example of a common grouping is all the objects (e.g., a shirt, shoes, pants, glasses, and a hat) associated with a particular person within the image 110. Although not limited in this manner, attributes of objects can include lighting conditions, stakeholder associated with the object, relative visibility (e.g., clearly visible, obscured, etc.), relative size of object (e.g., 10% of image 110), relationships between objects (e.g., a particular shirt is paired with particular pants), and relationships with other stakeholders (e.g., stakeholder A may have a positive (or negative) relationship with stakeholder C). The K-map engine 126 can draw upon both information generated by the object classification engine 123 (e.g., the identity of the objects along with an associated stakeholder 130, 130B, 130C of the object) as well as information from the data repository 125 (e.g., stakeholder relationships and object relationships).

In 250, upon generation of the knowledge map 300, an interface 127 of the image modification platform 120 triggers multimodal electronic communications with stakeholders 130A, 130B, 130C identified by the object classification engine 123 and found within the knowledge map 300. The purpose of these multimodal communications is to identify a set of constraints with regard to a modified image 140 to be generated from the initial image 110. These constraints can pertain to the usage of the modified image 140 and/or to the generation, by the interactive image generation engine 129, of the modified image 140. Generation of the modified image 140 will be discussed in more detail with regard to operation 260.

An example of a constraint pertaining to the usage of the modified image 140 can restrict publishing of the modified image 140 to one or more particular channels. Although not limited in this manner, a particular channel can be a user's personal website, a website associated within one or more of the stakeholders 130A, 130B, 130C, and/or in a particular marketing context. Examples of constrains pertaining to the generation the modified image 140 can include but are not limited to positional constraints, visual constraints, privacy constraints, and neighboring constraints. An example of a positional constraint pertains to a relative position of an object within the modified image 140. For example, an object that is placed next to another object, which makes it smaller/lesser in comparison. Examples of visual constraints can include whether the distinguishing feature (e.g., a logo) of the stakeholder 130A, 130B, 130C is visible, whether the object is damaged or otherwise depicted poorly (e.g., a soiled shirt), or whether the object is in focus and/or obscured by another object. An example of a privacy constraint can include whether the object should be in the modified image 140 at all. Another example would be to prevent objects/documents within the image 110 from including a personal identification. Examples of neighboring constraints regards whether certain objects should (or should not) be placed adjacent one another. For example, a vegan item being placed adjacent a non-vegan item may be prevented.

The interface 127 is not limited in the manner by which these constraints are determined. In certain aspects, these constraints can be directly provided by the stakeholders 130A, 130B, 130C. Additionally or alternatively, the image modification platform 120 can automatically generate these constraints. For example, the interface 127 can an AI-implemented chatbot that can be used to simulate conversation through communication technologies such as messaging applications, websites, mobile apps, etc. by which indications of these constraints can be gathered from the stakeholders 130A, 130B, 130C using, for example, directed questions/questionnaires to which the individual stakeholders 130A, 130B, 130C can respond. The interface 127 can collect these constraints contemporaneously with the creation of the K-map 300. In addition to or alternatively, one or more of the constraints can be retrieved from the data repository 125, which were stored after previously being collected (e.g., during the creation of a different modified image). Notably, the K-map 300 is used by the interface 127 to identify both the stakeholders 130A, 130B, and 130C to which the constraints apply as well as attributes of an object, which may be the subject of the constraints.

An example of an automatic generation of constraints by the image modification platform 120 can include parsing feedback 210 received by the stakeholders 130A, 130B, 130C in response to a proposed version of the modified image 140. Prior to the modified image 140 being published, the interface 127 can submit the modified image 140 to the relevant individual stakeholders 130A, 130B, 130C for their respective approval and/or comments via the interface 127. Based upon the approval (or lack thereof) and/or comments, the modified image 140 can be published or the image 110 can be modified again. Accordingly, the generation of the modified image 140 and the identification of the constraints can be an iterative process that repeats until an approval has been received from all of the relevant stakeholders 130A, 130B, 130C.

Additionally, the interface 127 can take the approval and/or comments as feedback 210 by which to automatically generate/modify the constraints. For example, the interface 127 can employ natural language processing and a cognitive engine to determine that the feedback comment of "always show watch in turn on mode" requires that visual constraint for the object "watch" requires that the watch be visual depicted in turn on mode. As another example, the interface 127 can automatically generate a constraint that if a product of Stakeholder A is within the modified image 140, then a product of Stakeholder B cannot be within the modified image 140 based upon a comment of "if P product is in the photo, we do not want to be in the photo." As yet another example, if a comment was received that "it is too cloudy out," the interface 127 may automatically generate a visual constraint that a particular object always be illustrated in a sunny environment.

In 260, once a set of constraints has been generated, the modified image 140 is generated based upon the set of constraints using the interactive image generation engine 129 of the image modification platform 120. Although the interactive image generation engine 129 is not limited to a particular technology that is used to generate a modified image 140, in certain aspects, the interactive image generation engine 129 employs a modified version of generative adversarial network (GAN) technology, which is a known technology used to generate images. In generating a modified image 140, the constraints for a particular object serve to produce three different results. One result is that the object is unchanged. The second result is that the object is removed. The third result is that certain visual/position characteristics of the object are changed (e.g., the focus can be modified, positioning changed, a different view angle, different lighting, etc.).

Figure 2B:
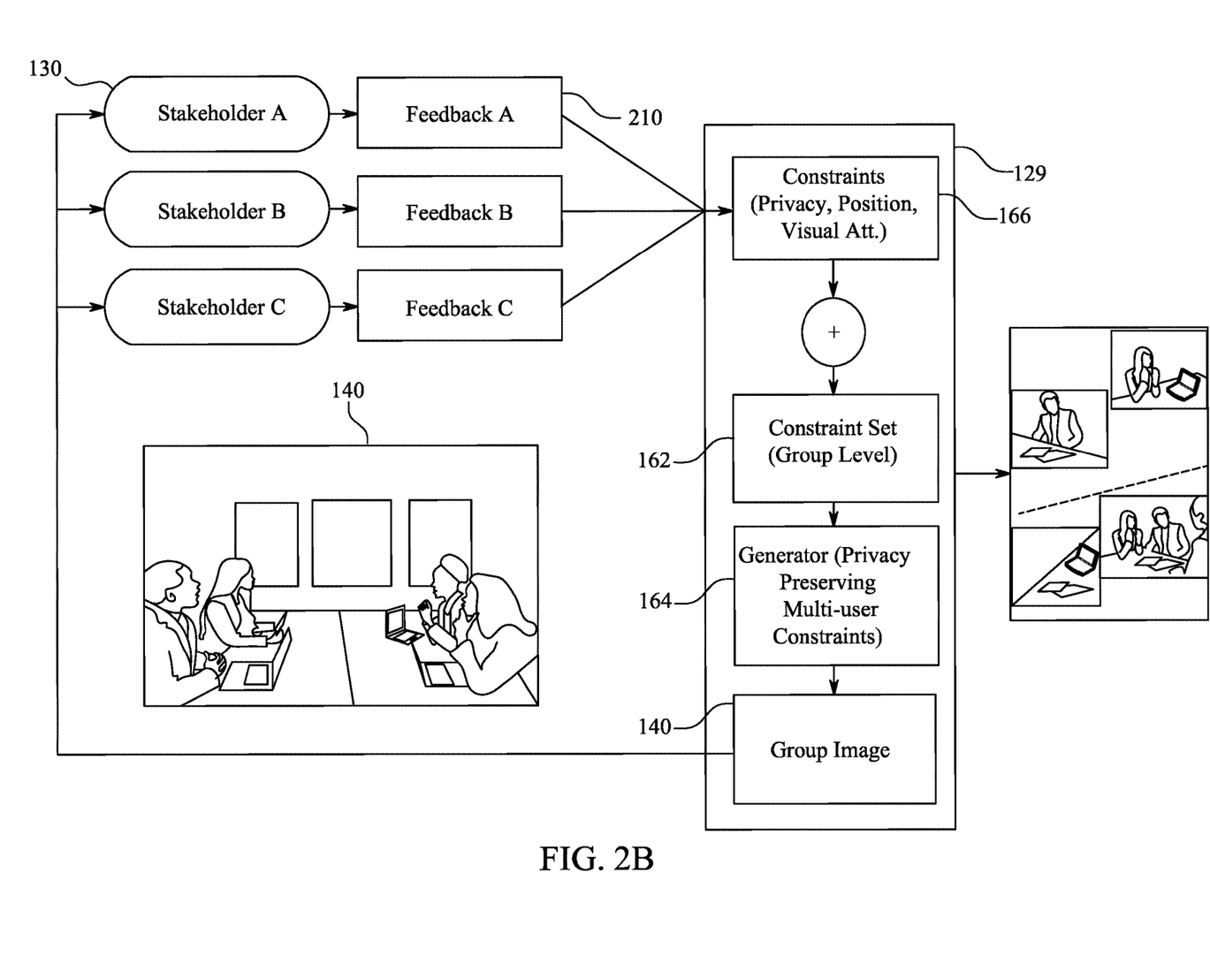
FIG. 2B is a block diagram illustrating an exemplary process involving the interactive image generation engine according to an embodiment of the present invention.

Referring to FIG. 2B, further aspects of an exemplary image generation engine 129 is disclosed. Using an initial constraint set 162, a generator 164 of the image generation engine 129 creates a first version of the modified image 140. While the generator 164 of the interactive image generation engine 129 uses constraints provided by the stakeholders 130A, 130B, 130C, the generator 164 can also use an internal constraint referred to herein as a popularity score. The popularity score is a score that reflects a computed expected reception for the entire composition of the modified image 140. For example, using the constraints provided by the stakeholders 130A, 130B, 130C, the generator 164 may produce a modified image 140 that meets all of these constraints, but this modified image 140 may not be compositionally aesthetically pleasing, which would be reflected in the popularity score. The individual objects within the modified image 140, for example, may be out of place relative to their context. Consequently, the generator 164 can be configured to not only generate a modified image 140 that meets the constraints provided by the stakeholders 130, 130B, 130C, but also to generate a modified image 140 that is aesthetically pleasing to a potential viewer of the modified image 140.

As discussed above, the interface 127 of the image modification platform 120 provides a version of the modified image 140 to the stakeholders 130, which subsequently provide feedback 210 as this version of the modified image 140. As also discussed above, this feedback 210 can be converted into additional constraints 166 that can be added to the initial constraint set 162. The constraint set 162, as modified, is then used to generate another modified image 140 that can be then sent to the stakeholders 130 for additional feedback 210. This is an iterative process that continues until all of the stakeholders 130 approve of the last provided version of the modified image 140.

In 270, once a final modified image 140 has been generated and approved by all of the relevant stakeholders 130A, 130B, 130C, the final modified image 140 can be published. As used herein, the term "publish" refers to providing the digital content, e.g., the modified image 140, to a particular electronic communication channel. As discussed above, one of the constraints include restricting the publishing of the final modified image 140 to a particular communication channel.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 4:
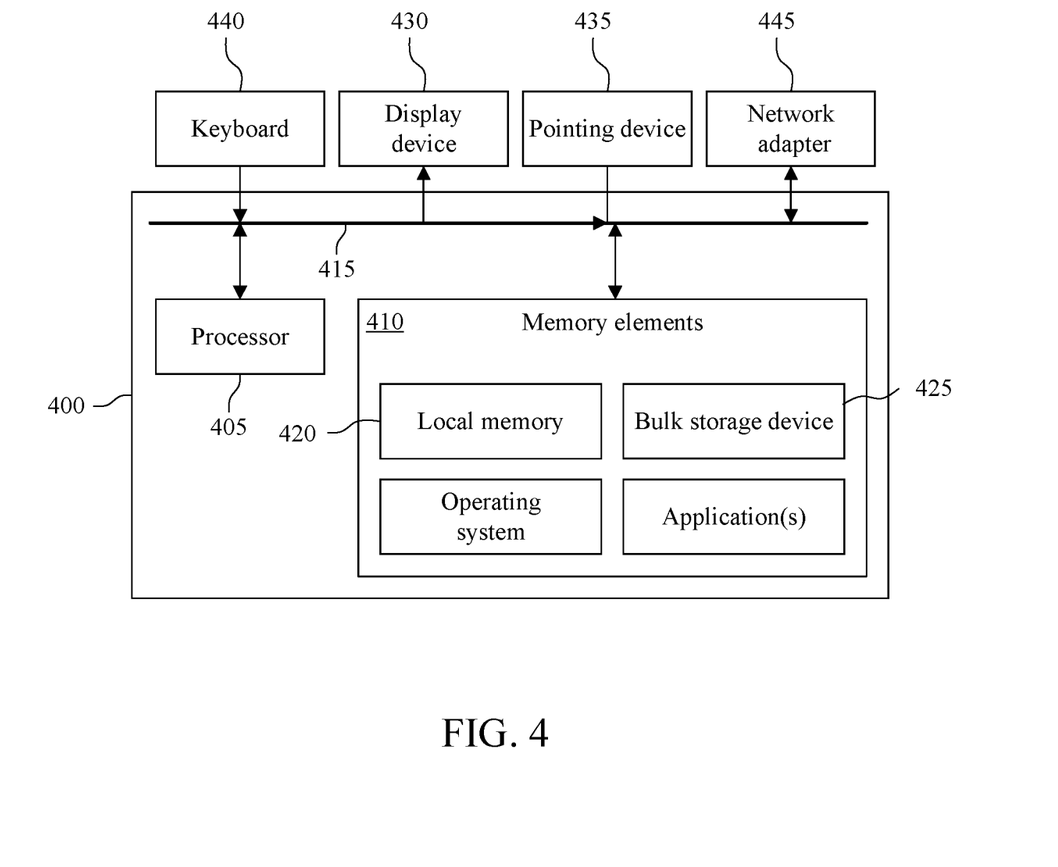
FIG. 4 is a block diagram illustrating an example of computer hardware system for implementing the image modification platform of FIG. 1.

FIG. 4 is a block diagram illustrating example architecture for a data processing service 400 for executing the image modification platform 120. The data processing system 400 can include at least one processor 405 (e.g., a central processing unit) coupled to memory elements 410 through a system bus 415 or other suitable circuitry. As such, the data processing system 400 can store program code within the memory elements 410. The processor 405 can execute the program code accessed from the memory elements 410 via the system bus 415. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The data processing system 400 also can include one or more cache memories (not shown) that provide temporary storage of at least some program code in order to reduce the number of times program code must be retrieved from the local memory 420 and/or bulk storage device 425 during execution.

Input/output (I/O) devices such as a display 430, a pointing device 435 and, optionally, a keyboard 440 can be coupled to the data processing system 400. The I/O devices can be coupled to the data processing system 400 either directly or through intervening I/O controllers. For example, the display 430 can be coupled to the data processing system 400 via a graphics processing unit (GPU), which may be a component of the processor 405 or a discrete device. One or more network adapters 445 also can be coupled to data processing system 400 to enable the data processing system 400 to become coupled to other systems, computer systems, remote printers, and/or remote storage devices through intervening private or public networks. Modems, cable modems, transceivers, and Ethernet cards are examples of different types of network adapters 445 that can be used with the data processing system 400.

As pictured in FIG. 4, the memory elements 410 can store the components of the image modification platform of FIG. 1. Being implemented in the form of executable program code, these components of the data processing system 400 can be executed by the data processing system 300 and, as such, can be considered part of the data processing system 400.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
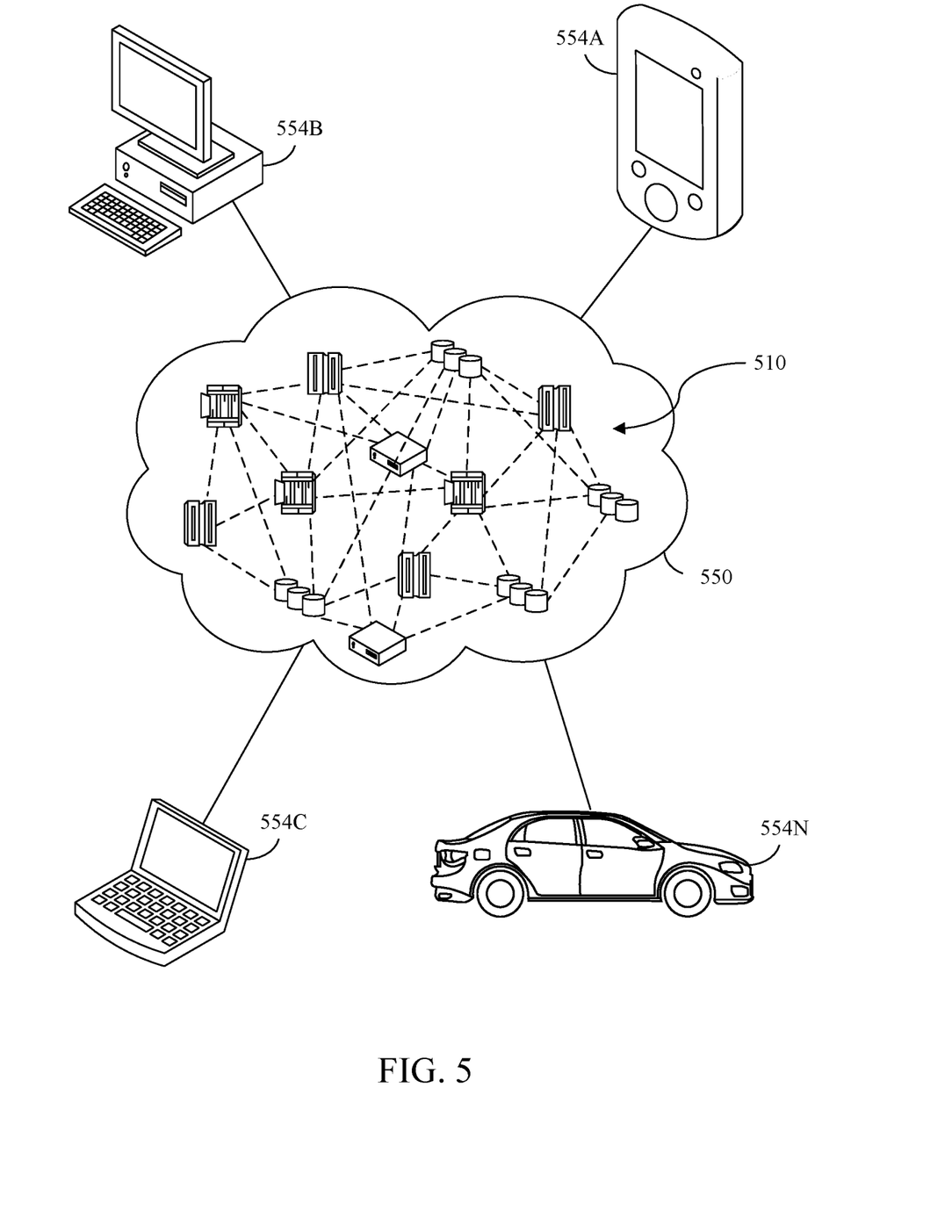
FIG. 5 depicts a cloud computing environment according to an embodiment of the present invention.

Referring now to FIG. 5, illustrative cloud computing environment 550 to be used with the FSD assistive system 115 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
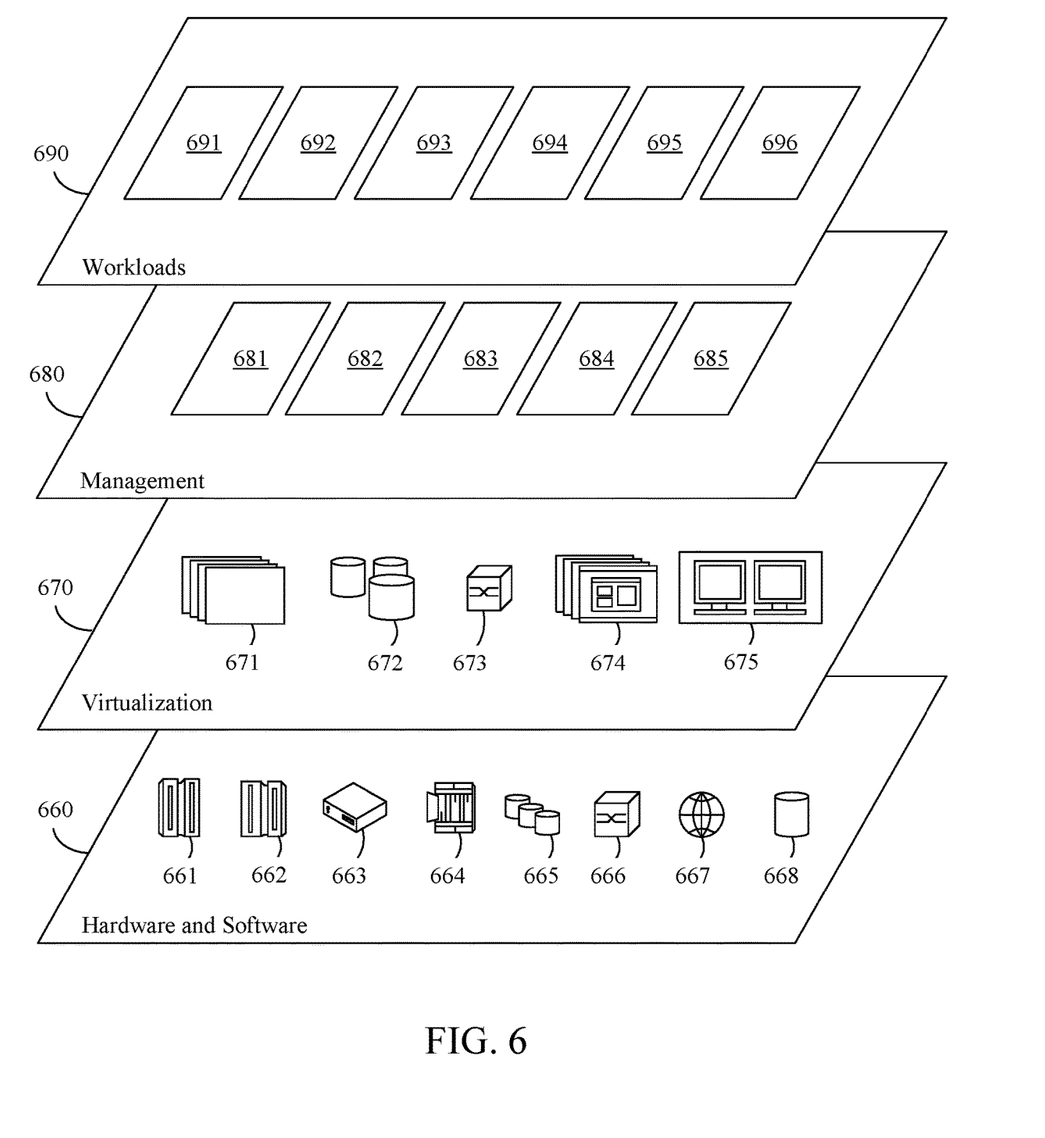
FIG. 6 depicts abstraction model layers according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and operations of the image modification platform 696.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process performed by a computer hardware system including an image modification platform, comprising:

receiving, by the image modification platform, a digital image;

detecting, using an object segmentation engine of the image modification platform, a plurality of objects within the digital image;
classifying, using an object classification engine of the image modification platform, the plurality of objects from within the digital image, the classifying including associating a stakeholder, respectively, to at least two of the plurality of objects;
generating, using a knowledge map engine, a knowledge map for the digital image based upon the classifying and the stakeholders,
identifying a set of constraints for each of the plurality of objects based upon the knowledge map and the plurality of stakeholders;
generating, by an interactive image generation engine, a modified digital image using the sets of constraints to be published.

2. The process of claim 1, wherein
the image modification platform is configured to initiate, based upon the knowledge map, a multimodal communication with the plurality of stakeholders, and
the sets of constraints are identified based upon information received by the image modification platform during the multimodal communication.

3. The process of claim 2, wherein
at least a portion of the sets of constraints are automatically generated using the information received by the image modification platform during the multimodal communication.

4. The process of claim 2, wherein
information provided to the stakeholders during the multimodal communication is based upon the knowledge map.

5. The process of claim 2, wherein
a version of the modified digital image is provided to the stakeholders,
feedback to the version of the modified digital image is received from the stakeholders and provided during the multimodal communication,
the sets of constraints are modified based upon the feedback, and
another version of the modified digital image is generated using the modified plurality of constraints.

6. The process of claim 5, wherein
the sets of constraints are iteratively modified based upon one or more additional versions of the modified image until a last modified digital image provided to the stakeholders is approved by all of the stakeholders, and
the last modified digital image is the modified digital image to be published.

7. The process of claim 1, wherein
at least one set of the sets of constraints include a positional constraint, a visual constraint, a privacy constraint, and a neighboring constraint.

8. The process of claim 1, wherein
the knowledge map for the digital image maps relationships between objects within the digital image and includes attributes for each of the objects.

9. A computer hardware system including an image modification platform, comprising:
a hardware processor configured to initiate the following executable operations:
receiving, by the image modification platform, a digital image;
detecting, using an object segmentation engine of the image modification platform, a plurality of objects within the digital image;
classifying, using an object classification engine of the image modification platform, the plurality of objects from within the digital image, the plurality of objects, the classifying including associating a stakeholder, respectively, to at least two of the plurality of objects;
generating, using a knowledge map engine, a knowledge map for the digital image based upon the classifying and the stakeholders,
identifying a set of constraints for each of the plurality of objects based upon the knowledge map and the plurality of stakeholders;
generating, by an interactive image generation engine, a modified digital image using the sets of constraints to be published.

10. The computer hardware system of claim 9, wherein
the image modification platform is configured to initiate, based upon the knowledge map, a multimodal communication with the plurality of stakeholders, and
the sets of constraints are identified based upon information received by the image modification platform during the multimodal communication.

11. The computer hardware system of claim 10, wherein
at least a portion of the sets of constraints are automatically generated using the information received by the image modification platform during the multimodal communication.

12. The computer hardware system of claim 10, wherein
information provided to the stakeholders during the multimodal communication is based upon the knowledge map.

13. The computer hardware system of claim 10, wherein
a version of the modified digital image is provided to the stakeholders,
feedback to the version of the modified digital image is received from the stakeholders and provided during the multimodal communication,
the sets of constraints are modified based upon the feedback, and
another version of the modified digital image is generated using the modified plurality of constraints.

14. The computer hardware system of claim 13, wherein
the sets of constraints are iteratively modified based upon one or more additional versions of the modified image until a last modified digital image provided to the stakeholders is approved by all of the stakeholders, and
the last modified digital image is the modified digital image to be published.

15. The computer hardware system of claim 9, wherein
at least one set of the sets of constraints include a positional constraint, a visual constraint, a privacy constraint, and a neighboring constraint.

16. The computer hardware system of claim 9, wherein
the knowledge map for the digital image maps relationships between objects within the digital image and includes attributes for each of the objects.

17. A computer program product, comprising:
a computer readable storage medium having stored therein program code,
the program code, which when executed by a computer hardware system including an image modification platform, causes the computer hardware system to perform:
receiving, by the image modification platform, a digital image;
detecting, using an object segmentation engine of the image modification platform, a plurality of objects within the digital image;

classifying, using an object classification engine of the image modification platform, the plurality of objects from within the digital image, the classifying including associating a stakeholder, respectively, to at least two of the plurality of objects;

generating, using a knowledge map engine, a knowledge map for the digital image based upon the classifying and the stakeholders, identifying a set of constraints for each of the plurality of objects based upon the knowledge map and the plurality of stakeholders;

generating, by an interactive image generation engine, a modified digital image using the sets of constraints to be published.

18. The computer program product of claim 17, wherein the image modification platform is configured to initiate, based upon the knowledge map, a multimodal communication with the plurality of stakeholders, the sets of constraints are identified based upon information received by the image modification platform during the multimodal communication, at least a portion of the sets of constraints are automatically generated using the information received by the image modification platform during the multimodal communication, and information provided to the stakeholders during the multimodal communication is based upon the knowledge map.

19. The computer program product of claim 18, wherein a version of the modified digital image is provided to the stakeholders, feedback to the version of the modified digital image is received from the stakeholders and provided during the multimodal communication, the sets of constraints are modified based upon the feedback, another version of the modified digital image is generated using the modified plurality of constraints, the sets of constraints are iteratively modified based upon one or more additional versions of the modified image until a last modified digital image provided to the stakeholders is approved by all of the stakeholders, and the last modified digital image is the modified digital image to be published.

20. The computer program product of claim 17, wherein the knowledge map for the digital image maps relationships between objects within the digital image and includes attributes for each of the objects.

* * * * *